Sept. 18, 1934.   C. F. ALLISON ET AL   1,973,696
BAG CLOSING MACHINE
Filed Oct. 30, 1930   15 Sheets-Sheet 11

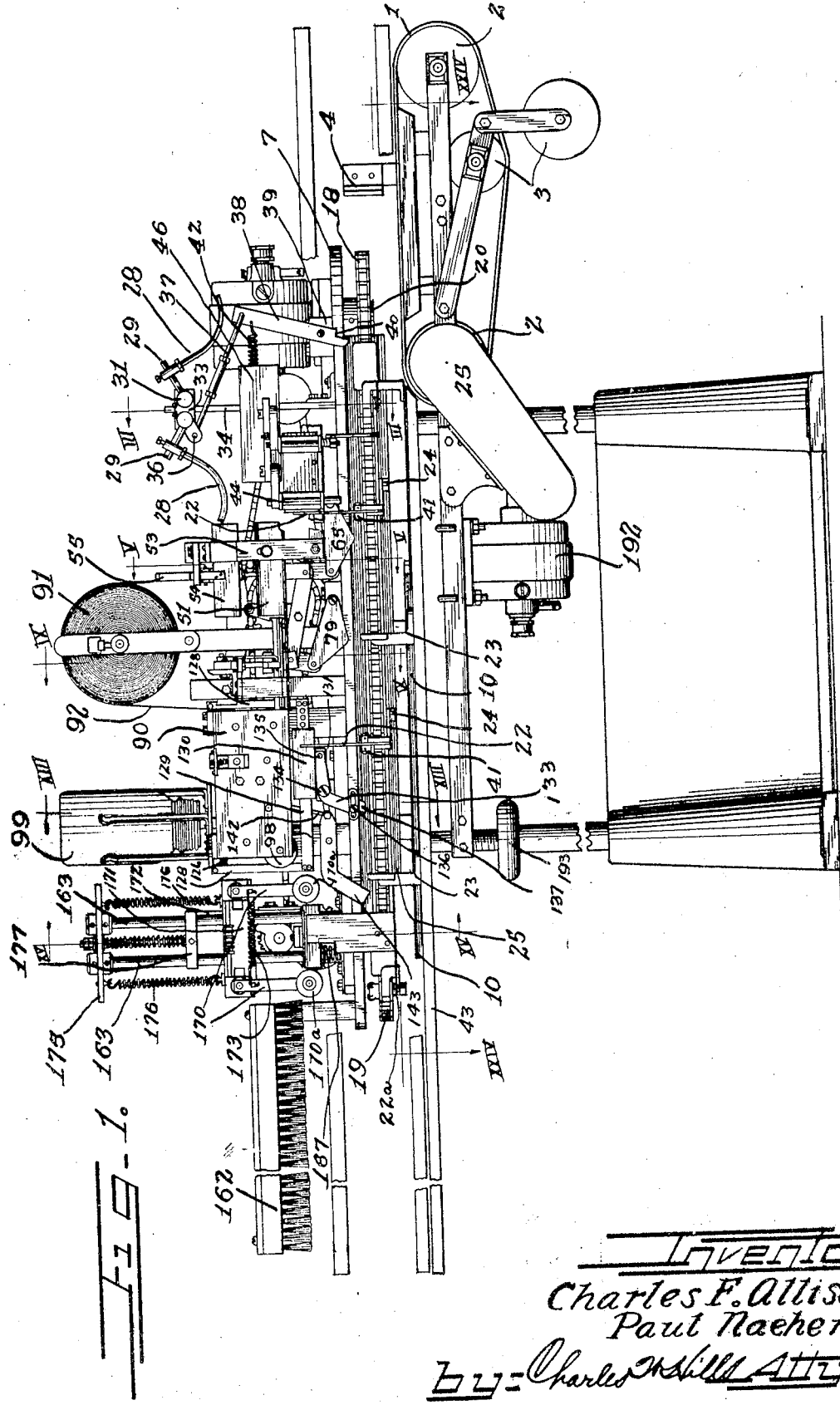

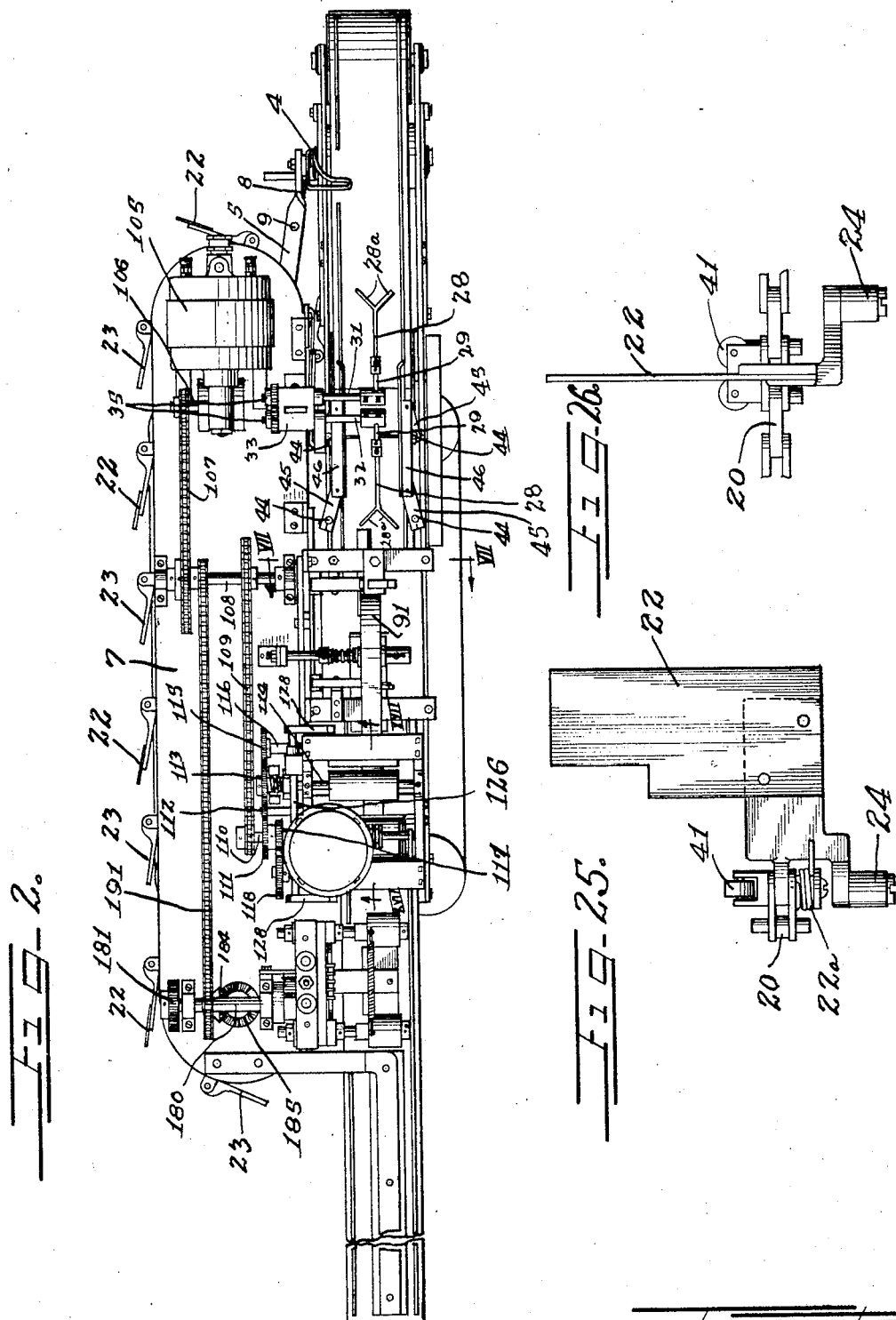

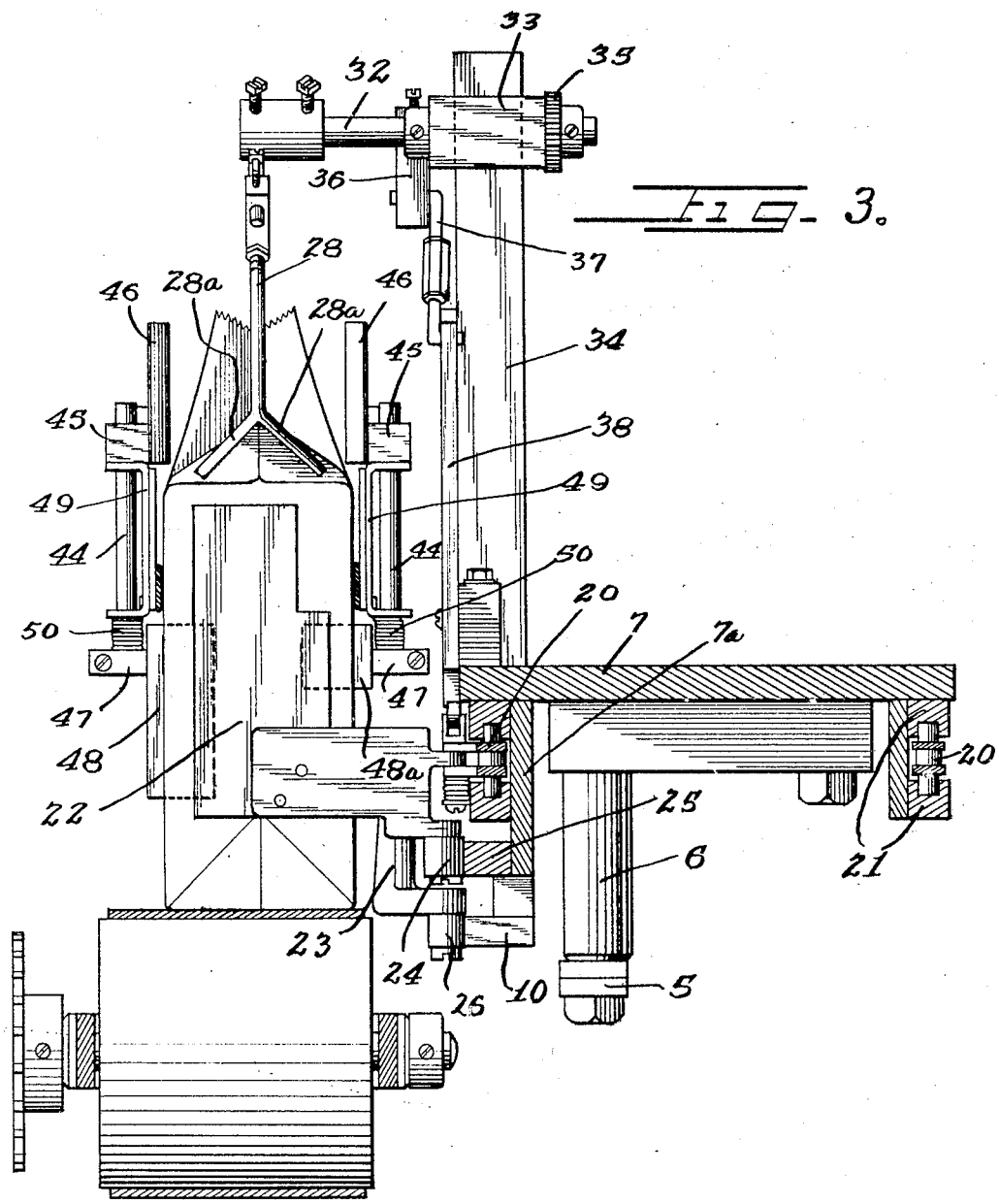

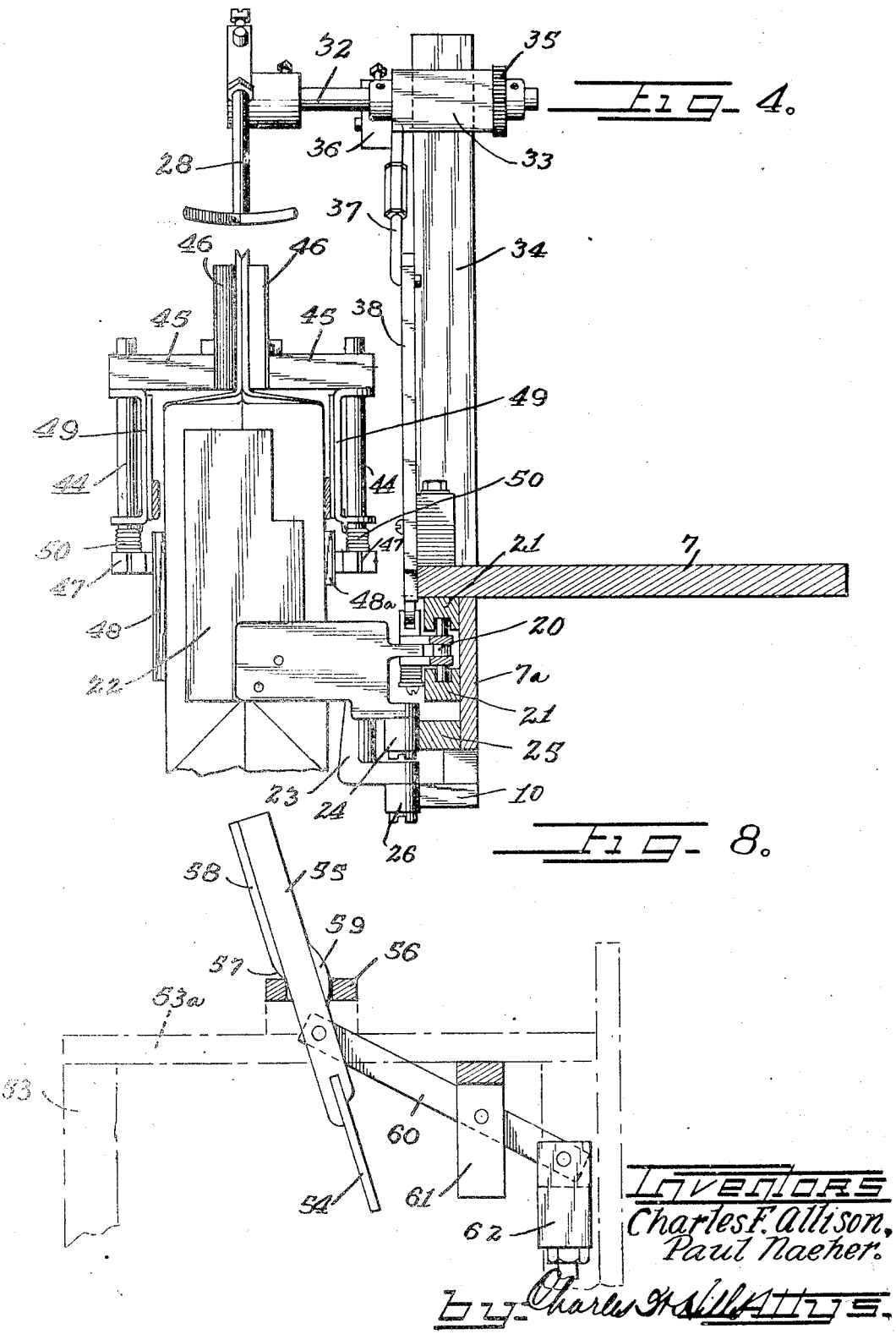

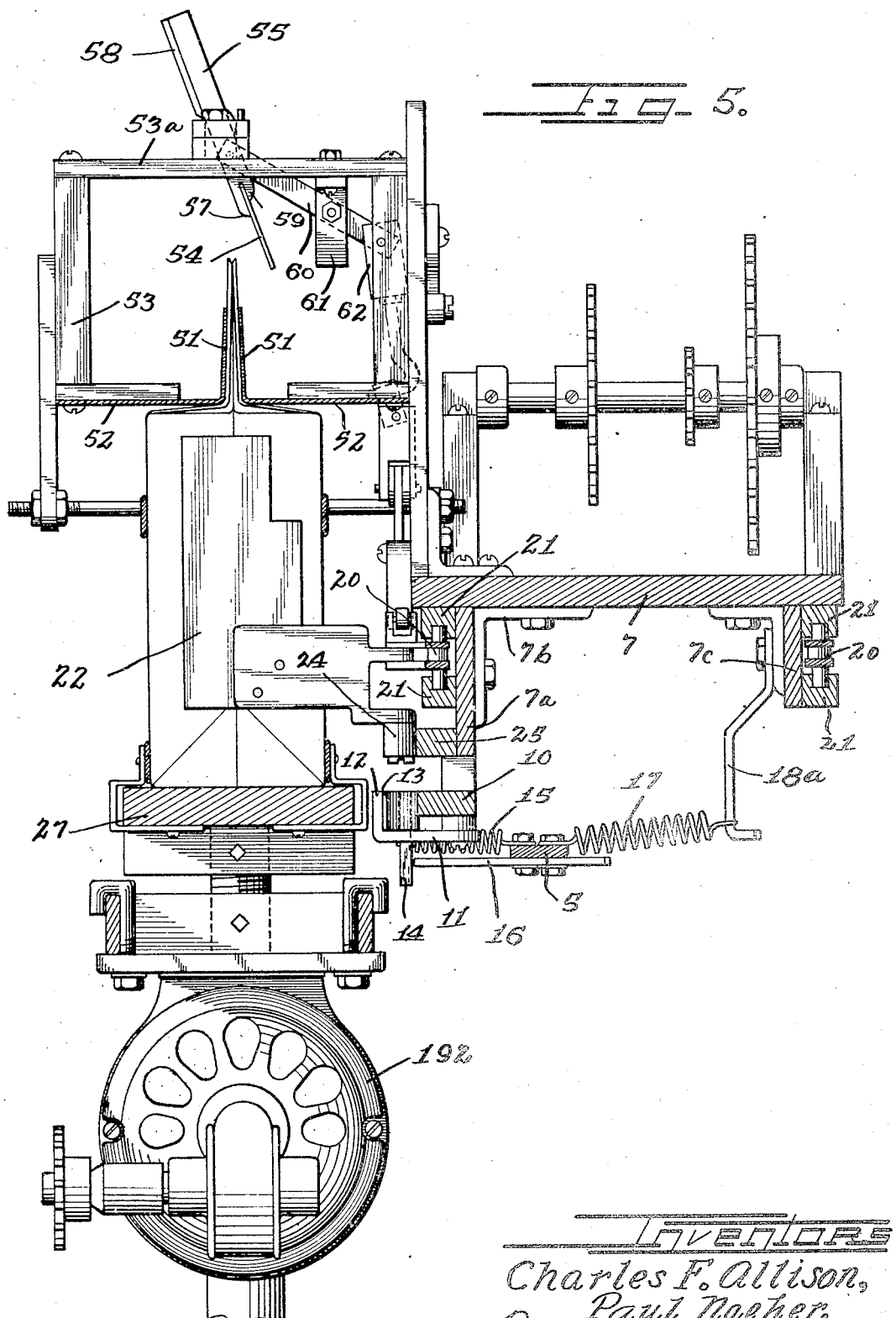

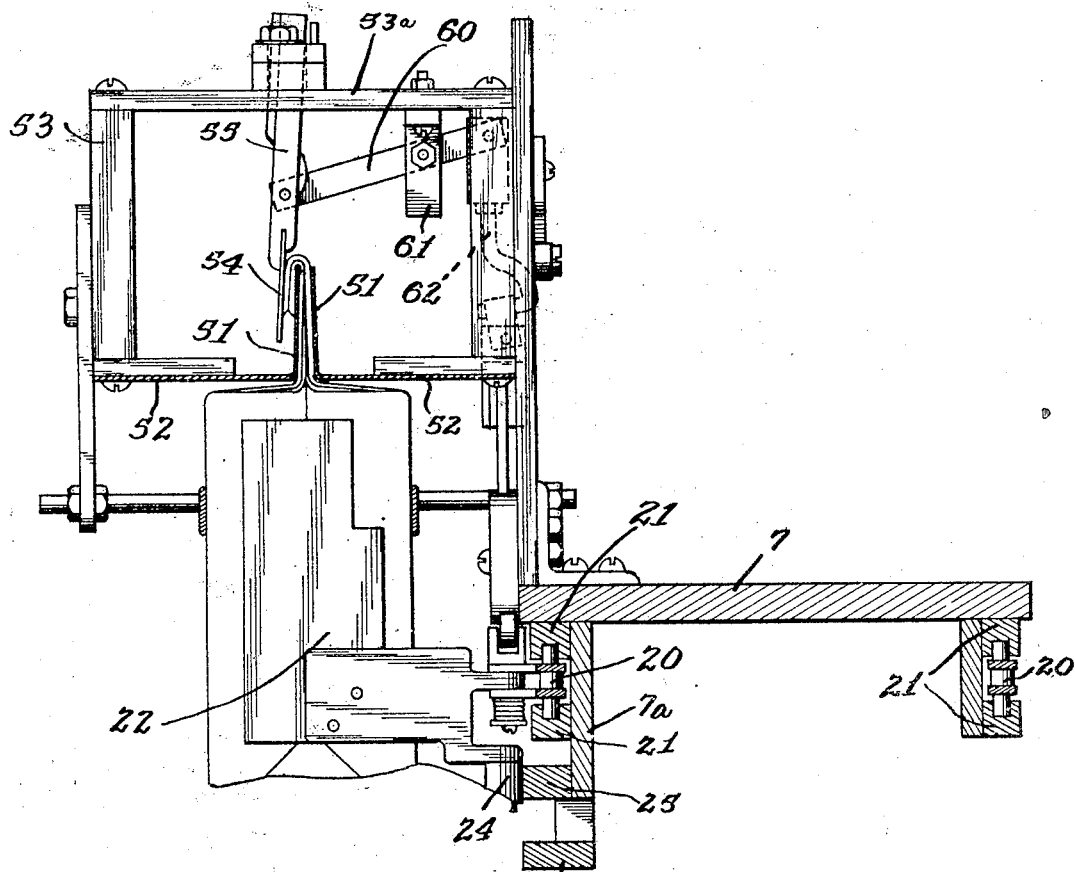
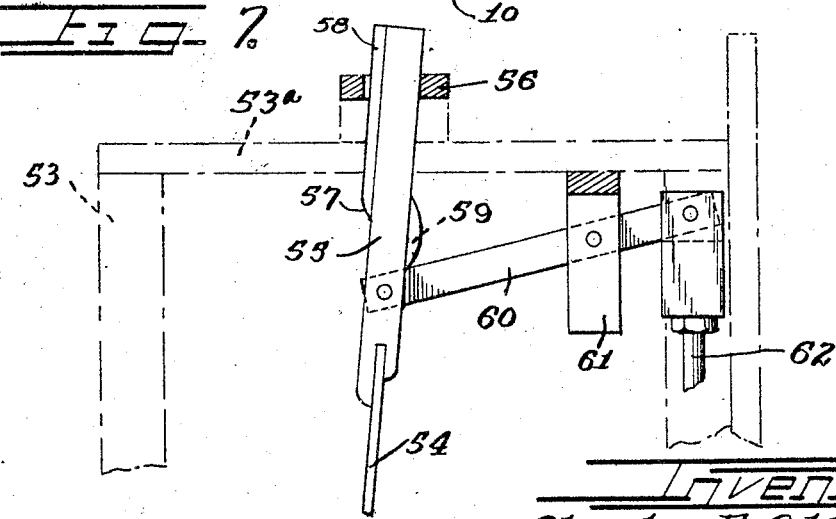

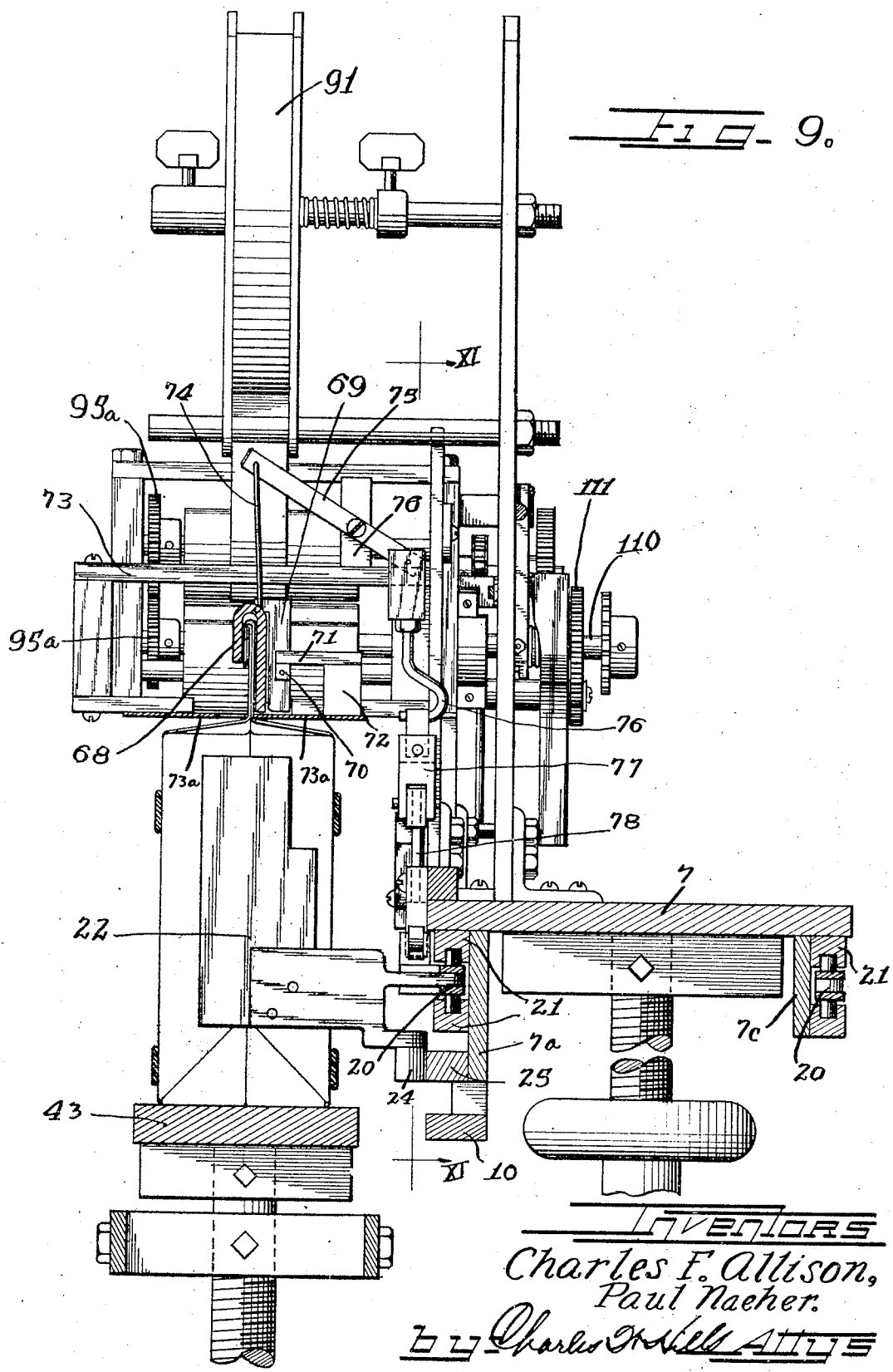

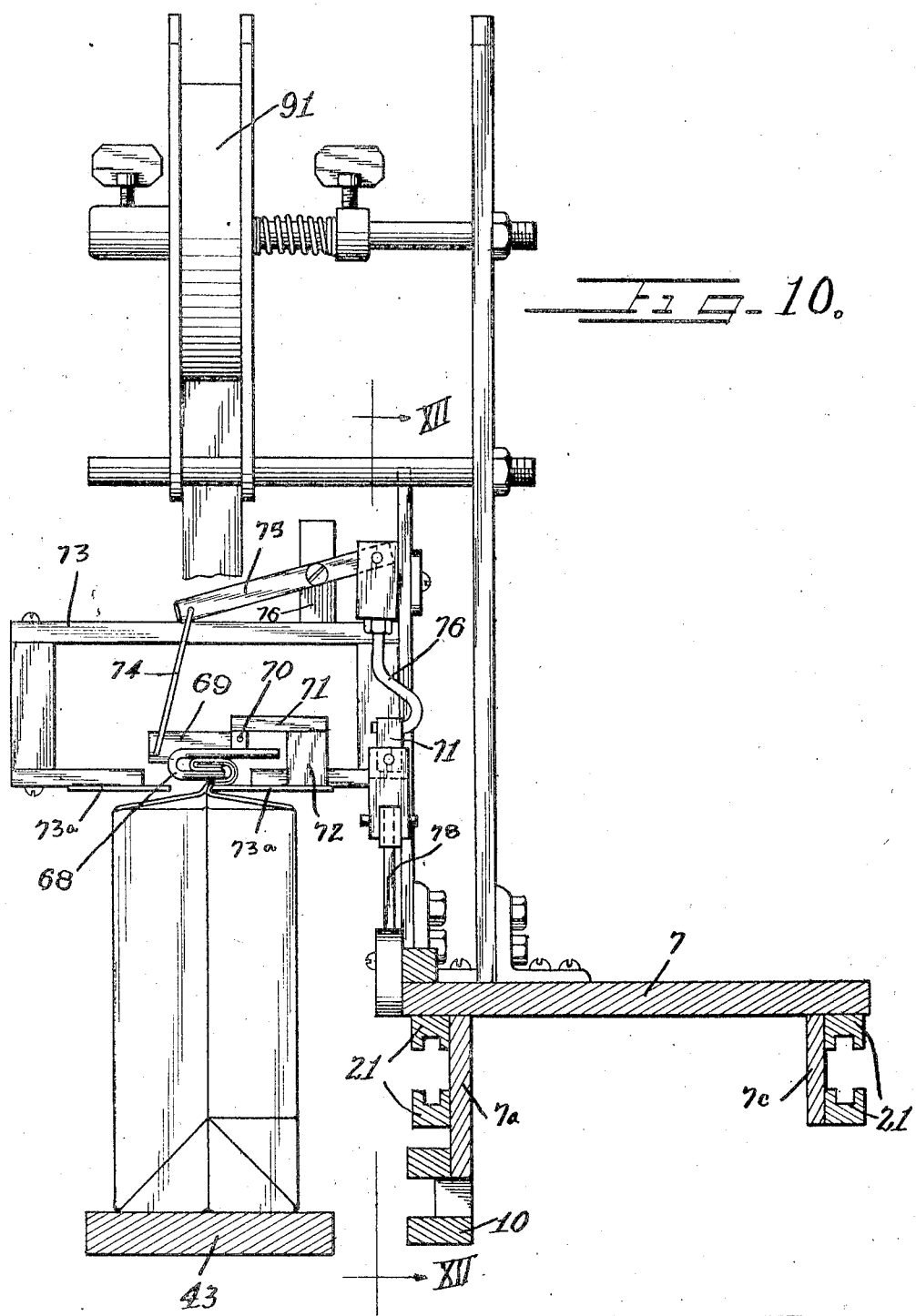

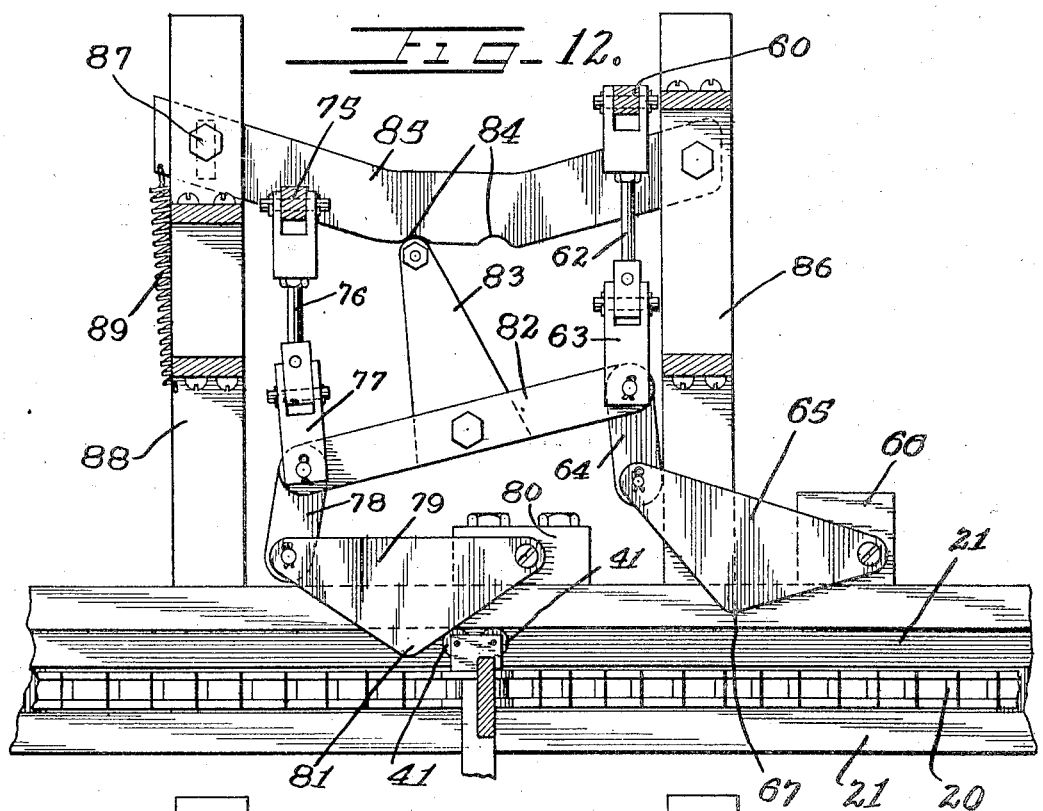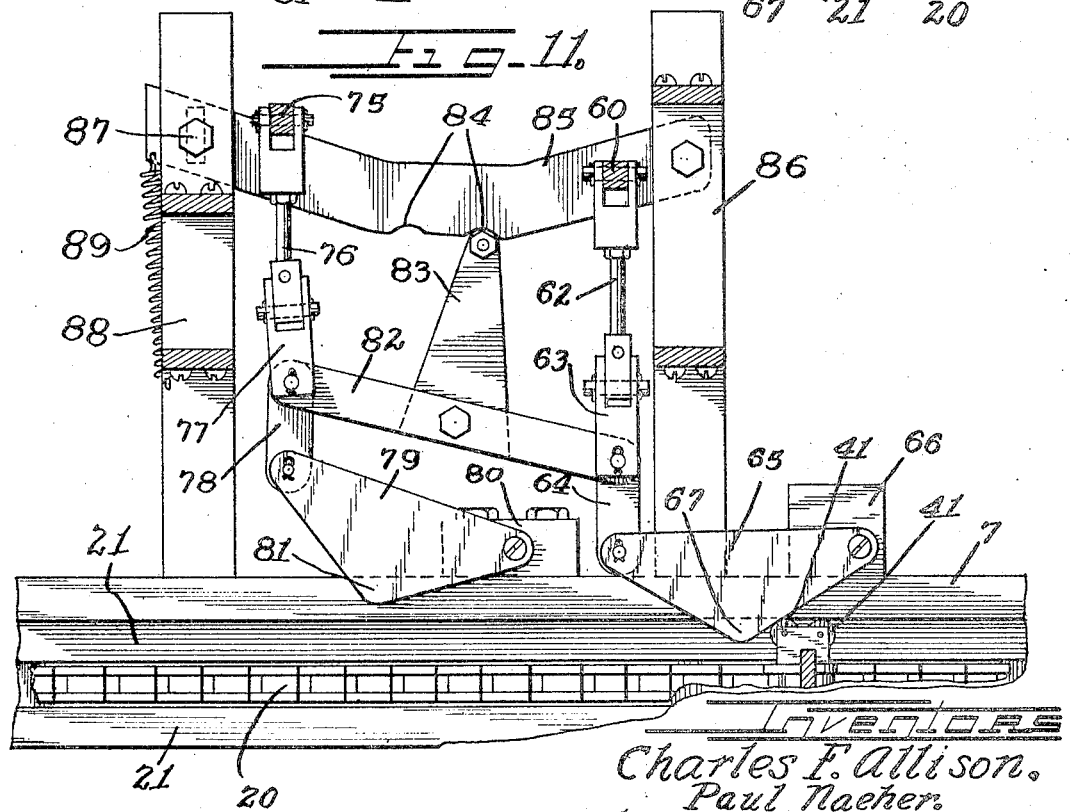

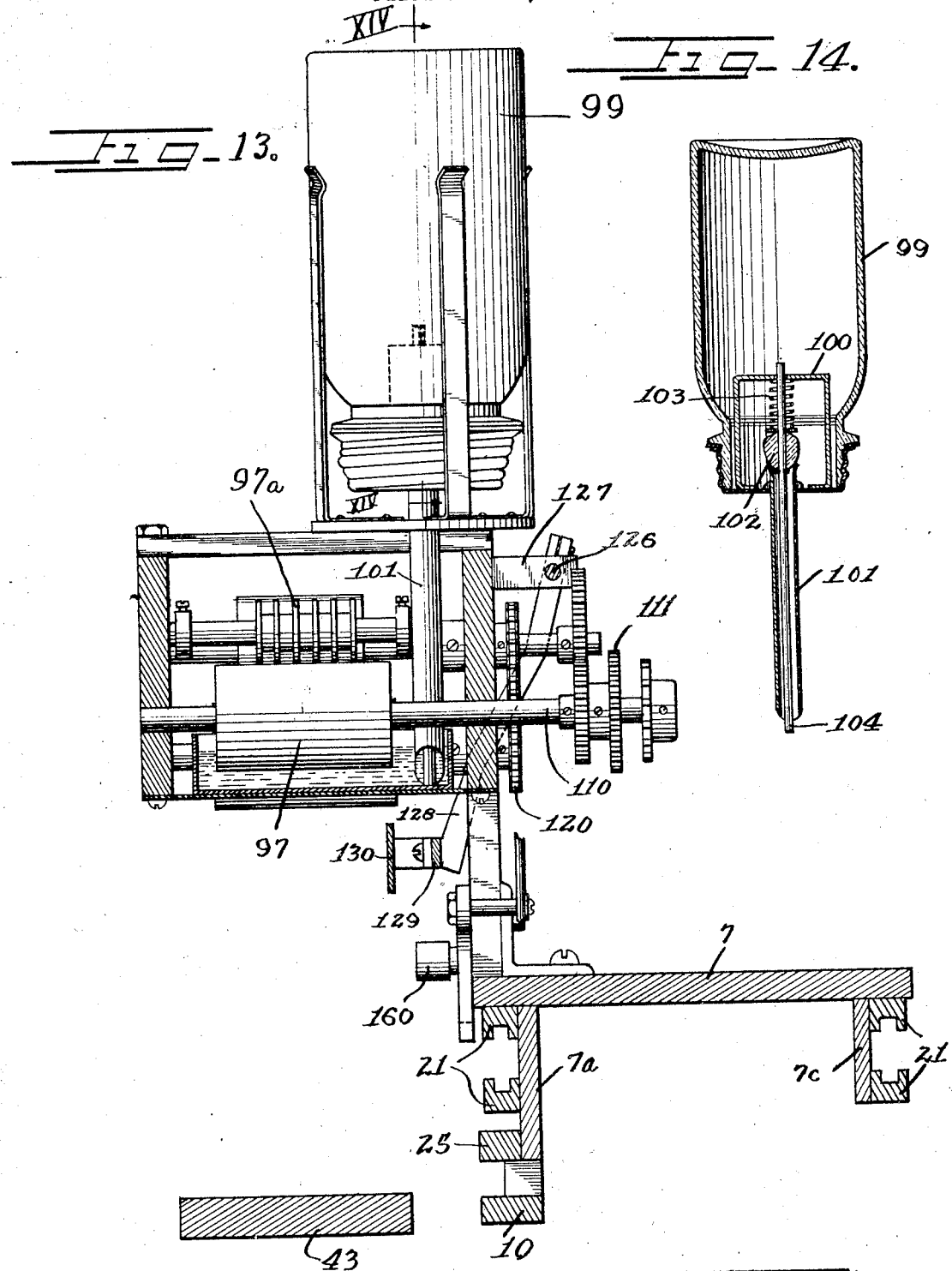

Inventors
Charles F. Allison,
Paul Naeher.
By Charles F. Wells Attys.

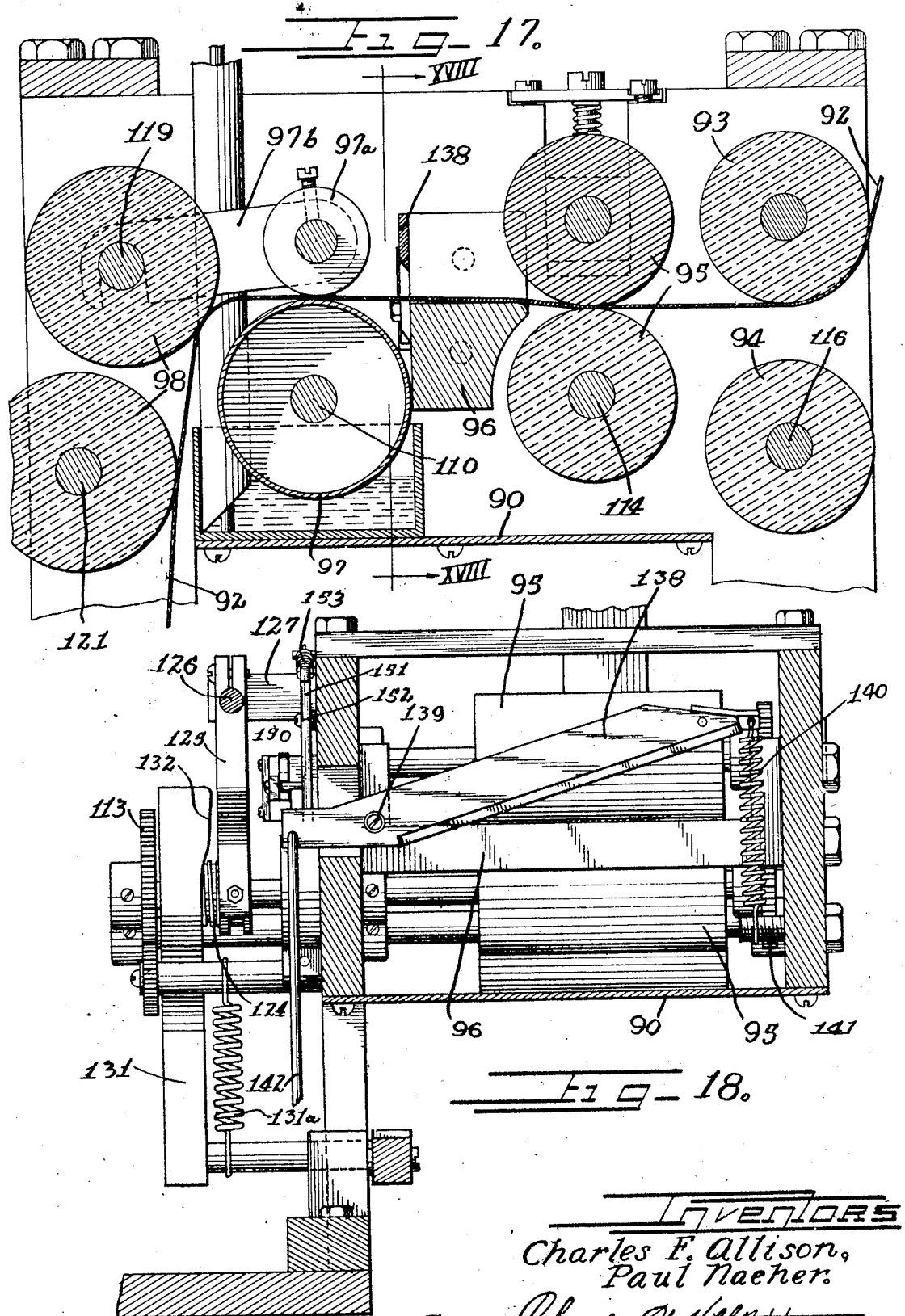

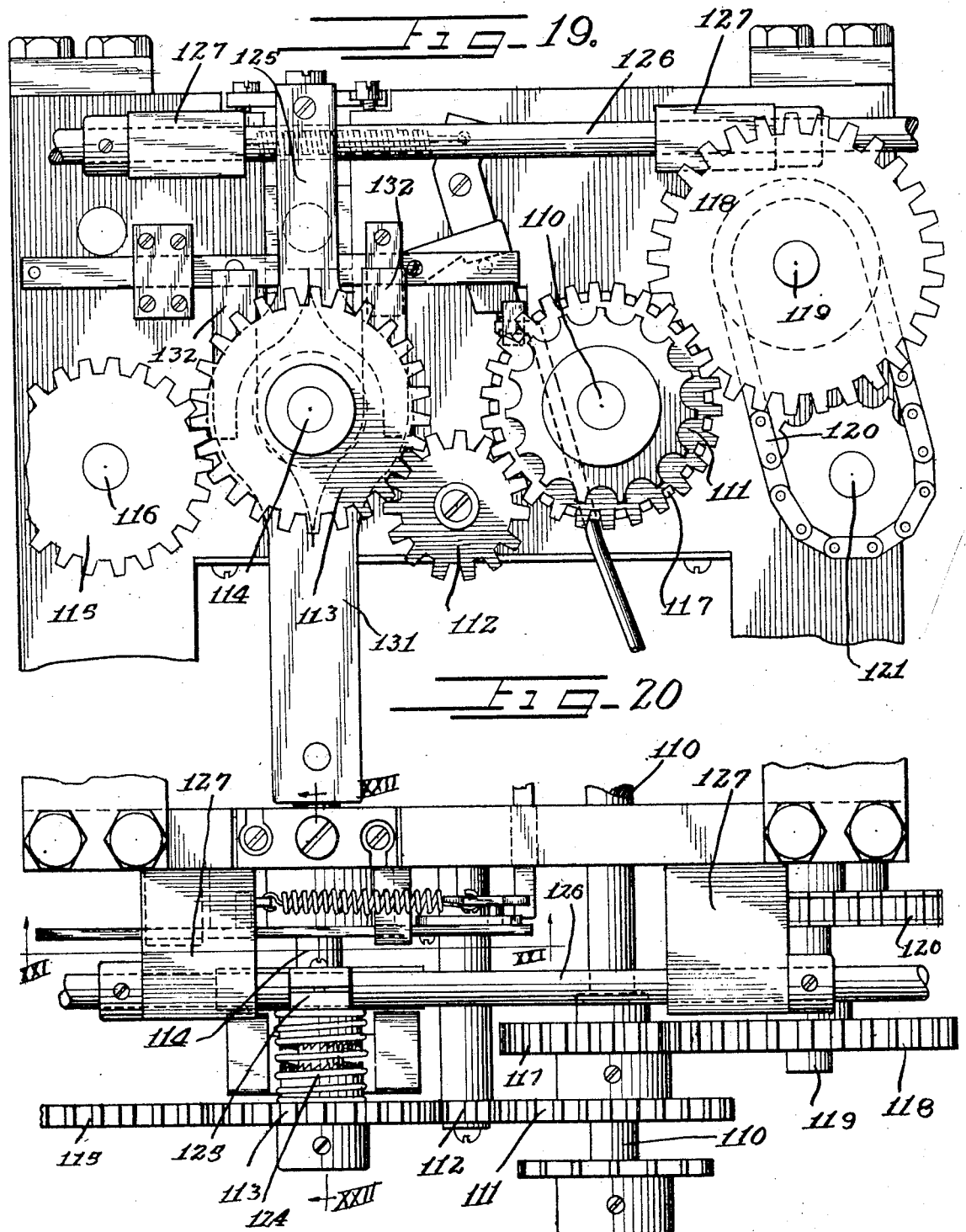

Sept. 18, 1934. C. F. ALLISON ET AL 1,973,696
BAG CLOSING MACHINE
Filed Oct. 30, 1930 15 Sheets-Sheet 15
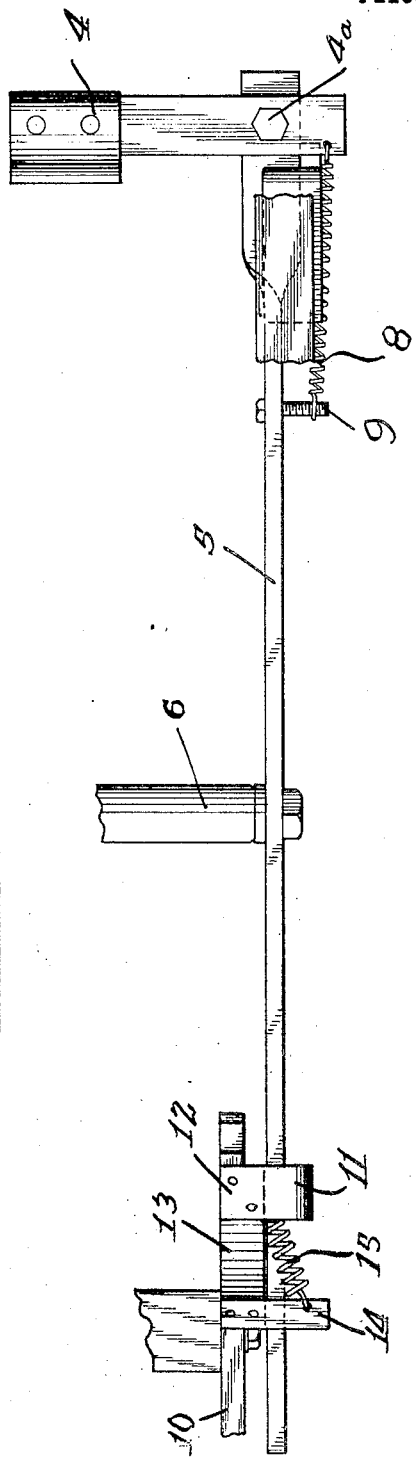
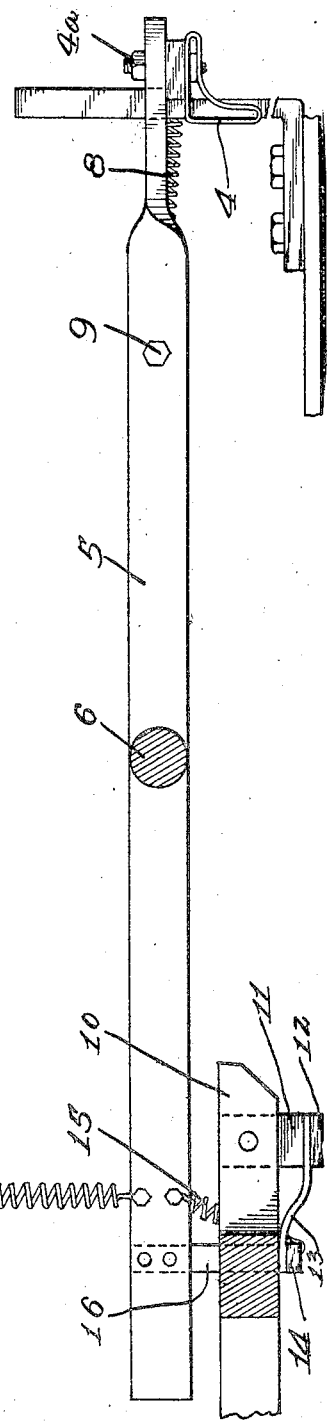
Inventors
Charles F. Allison,
Paul Naeher.

Patented Sept. 18, 1934

1,973,696

UNITED STATES PATENT OFFICE 1,973,696

BAG CLOSING MACHINE

Charles F. Allison and Paul Naeher, Chicago, Ill., assignors to B. F. Gump Co., Chicago, Ill., a corporation of Illinois Application October 30, 1930, Serial No. 491,923

20 Claims. (Cl. 93—7)

This invention relates to a bag closing machine. Machines of this type generally operate intermittently while the different operations on the bag are being performed. According to this invention, the conveyor chain that propels the bag is operated continuously and the major portions of the devices for operating upon the bag are controlled by the traveling movement of the bag propelling chain.

It is among the objects of this invention to provide means for regulating the supply of bags to the machine, means for tucking in the ends of the bag so as to crease the same upon diverging lines, means to fold the empty neck of the bag and position the same over the center line of the bag, means for applying a piece of adhesive tape over the top of the bag, and means for pressing the tape upon the top and against the ends of the bag. These different operations are carried on without any cessation in the rotation of the bag propelling chain in a manner to be later explained.

The invention comprises the novel structure and combination of parts hereinafter described and more particularly pointed out and defined in the appended claims.

On the drawings:

Figure 1 is a front side elevational view of the bag closing machine involving this invention.

Figure 2 is a top plan view of the same.

Figure 3 is an enlarged sectional view taken upon the line III—III of Figure 1 looking in the direction of the arrows and showing parts in elevation.

Figure 4 is a view similar to Figure 3 illustrating the bag slightly advanced in the machine and the end tucking element in raised position.

Figure 5 is an enlarged sectional view taken upon the line V—V of Figure 1 showing parts in elevation.

Figure 6 is a view similar to Figure 5 illustrating the manner of making the first fold.

Figure 7 is a sectional view taken upon the line VII—VII of Figure 2, illustrating parts in elevation.

Figure 8 is a view similar to Figure 7 illustrating the mechanism in another position.

Figure 9 is an enlarged sectional view taken through the line IX—IX of Figure 1, showing parts in elevation.

Figure 10 is a view similar to Figure 9 illustrating the second position of the second folding mechanism with parts omitted.

Figure 11 is a sectional view taken upon the line XI—XI of Figure 9 with parts omitted, illustrating the manner of operating the folding mechanism from the bag propelling chain.

Figure 12 is a view similar to Figure 11, showing parts in a different position.

Figure 13 is an enlarged sectional view taken upon the line XIII—XIII of Figure 1, showing parts in elevation.

Figure 14 is an enlarged sectional view taken upon the line XIV—XIV of Figure 13.

Figure 17 is an enlarged vertical sectional view through the tape box taken substantially upon line XVII—XVII of Figure 2.

Figure 18 is an enlarged sectional view taken substantially upon line XVIII—XVIII of Figure 17.

Figure 19 is a rear elevational view of the tape box illustrating the operating mechanism.

Figure 20 is a fragmentary top plan view of the structure shown in Figure 19.

Figure 23 is a plan view of the bag timer or regulator.

Figure 24 is an enlarged sectional view taken upon line XXIV—XXIV of Figure 1, showing parts in elevation.

Figure 25 is a fragmentary elevational view partly in section, illustrating a feature of the machine.

Figure 26 is a front elevational view of Figure 25.

Figures 15, 16:
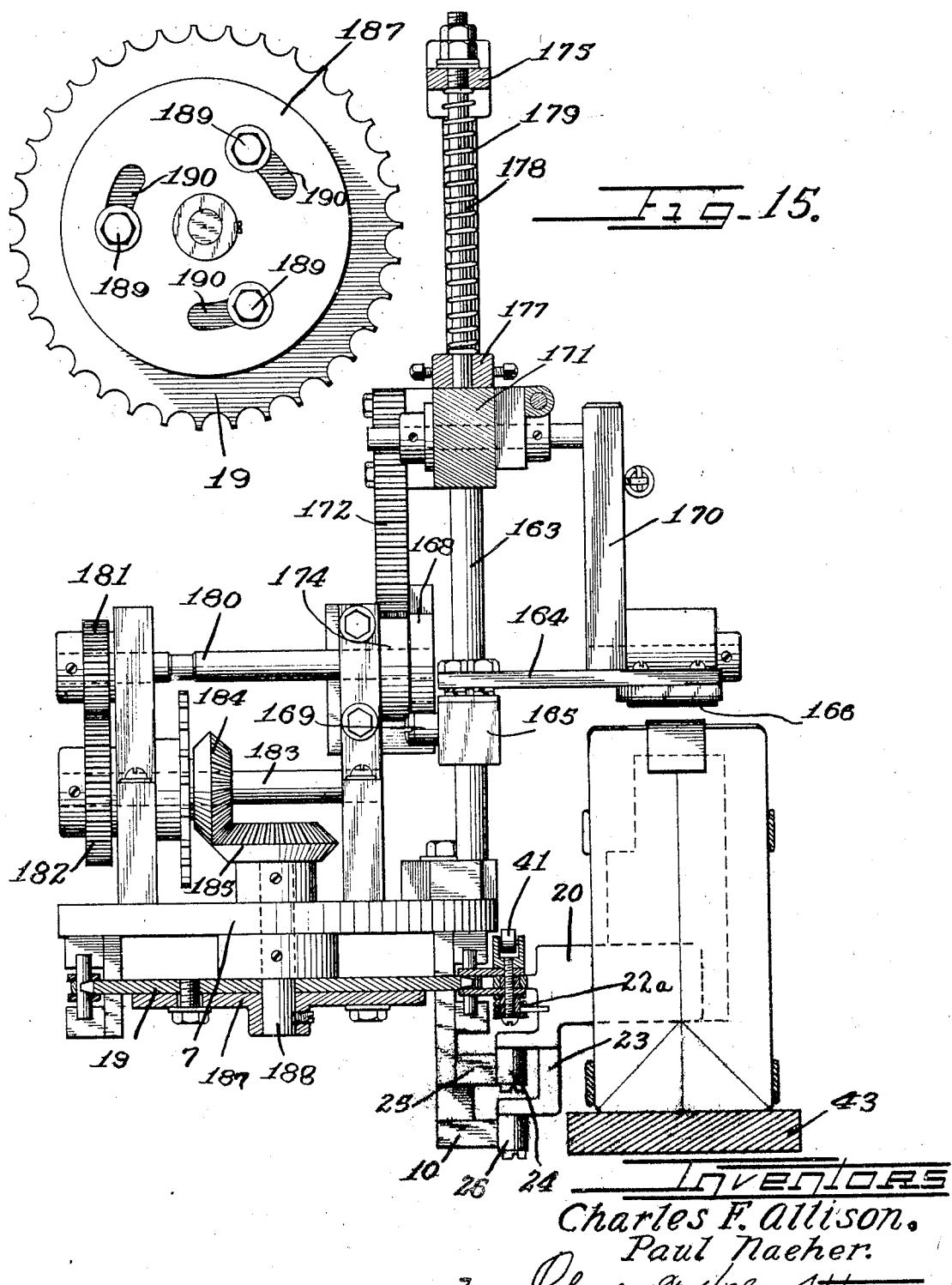
Figure 15 is an enlarged sectional view taken upon the line XV—XV of Figure 1, showing parts in elevation.
Figure 16 is an elevational view of the adjustable head sprocket.

In referring to the drawings, the bag timing or regulating mechanism located at the front end of the machine will first be described. This mechanism is best illustrated in Figures 1, 3, 5, 23, and 24. In Figure 1, it will be noted that a feeding belt 1 is supported upon rollers 2 at the front end of the machine. A belt tightening mechanism generally noted by the reference numeral 3 is adapted for maintaining the upper reach of the feeding belt in taut position. Supported so as to overhang the inner portion of the belt, there is a stop member 4 which is secured by means of a bolt 4a to a longitudinally extending pivot bar 5 pivoted intermediate its ends upon a rod-like support 6 which depends from the bench 7 of the machine as shown in Figure 3.

The lower end of the stop member 4 is connected by means of a spring 8 to a stud 9 secured upon the pivot bar 5. It will, of course, be understood that the pivot bar 5 is located below and spaced from the inner edge of the feed belt 1 as shown in Figure 5. Spaced inwardly from the front edge of the bench 7 there is a depending plate 7a which is secured to the bench by means of angle irons 7b as shown in Figure 5. This depending plate 7a has a lower track 10 attached thereto and upon this track 10 there is secured an L-shaped member 11 which is shown secured to the bottom of the track with a flange 12 upstanding in parallel relation with the track 10 but spaced therefrom a suitable distance. A leaf spring 13 is secured to the upstanding flange 12 of the L-shaped member 11 and the rear portion of this spring 13 is deflected inwardly until it contacts the track 10 as shown in Figure 24. To the rear end of the spring 13 there is secured a depending strip 14 which is connected by means of a spring 15 with the pivot bar 5. Upon the lower side of the pivot bar there is secured a stop member 16 which extends transversely and is adapted to contact the depending strip 14 as shown in Figure 5 to limit the outward movement of the pivot bar 5 under the influence of the spring 15. The rear end of the pivot bar 5 is also connected by means of a spring 17 with a hook member 18a depending from the opposite side of the bench 7, as shown in Figure 5. Supported upon the forward end of the bench 7 there is a tail sprocket 18. Upon the rear end of the bench 7 there is a head sprocket 19. A sprocket chain 20 is trained around the head and tail sprockets, and the pivots of this chain travel in suitable guides 21 secured upon the plate 7a and the rear plate 7c. Alternate high and low bag propellers 22 and 23 are carried by the chain 20, as shown in Figure 1. The high propellers 22 carry rollers 24 which are adapted for engaging a track member 25 upon the plate member 7a. The low bag propellers 23 are provided with rollers 26 which are adapted for engaging the track 10 which, it will be noted, is located below the track 25.

With reference to Figure 1, it will be noted that the track 25 extends from a point adjacent the tail sprocket 18 to a point spaced forwardly from the head sprocket 19 and that the lower track 10 starts at a point spaced considerably rearward of the tail sprocket 18 and extends beyond the upper track 25 and to a point substantially at the rear end of the machine. It might be here mentioned that the upper bag propellers 22 are controlled by coiled springs 22a thereon which firmly tend to hold the rollers 24 against the track 25 which is only located upon the front side of the machine. Consequently, when the rollers 24 pass off the track 25 such springs will flop the high propellers 22 rearwardly with respect to the travel of the chain against a stop 160 (Fig. 13) on the guides 21, so that the same may pass behind the bag that is being propelled for allowing the same to remain stationary for such a period of time as is necessary for pressing the tape thereon and allowing the next lower bag propeller 23 to reach the bag and propel the same the remainder of the distance to the end of the machine.

Reverting now to the bag timer or regulator, which is normally positioned over the bag feeding belt 1 and stops a bag from advancing until the proper time, it will be noted that when the roller 26 of a lower bag propeller reaches the spring 13 and travels between it and the rail 10 and forces said spring outwardly, and through the instrumentality of the spring 15 the pivot bar 5 will be swung to remove the stop member 4 from the path of the bag allowing the feed belt 1 to advance the released bag to the bag-closing machine. Of course, as soon as the roller 26 of one of the lower bag propellers 23 passes beyond the spring 13, the spring 17 will swing the bar 5 back and the stop member 4 into the path of the oncoming bag on the feeding belt 1 until the next oncoming lower bag propeller again actuates the bar 5. Accordingly, the bags are fed into the machine in proper timed relation to be engaged by one of the upper bag propellers 22. It will, of course, be understood that the chain travels in an oblong path around the table or bench 7 in the guides 21.

As a bag is fed to the machine by the feed belt 1, it is adapted to be engaged by one of the upper bag propellers 22 and moved rearwardly in a continuous manner until it reaches the tape applying mechanism. Describing now the different operations that take place on the bag as it moves in its course around the front side of the bench, the first operation will be called the "end tucking" which is performed by a pair of arms 28 (Figures 1, 2, 3, and 4), which are adjustably mounted upon pins 29 suitably fastened upon shafts 31 and 32 (Fig. 2). The shafts 31 and 32 are journalled in a bearing 33 which is supported upon upright or standard 34. The shafts 31 and 32 extend through the bearing 33 and are geared for conjoint rotation by means of the gears 35 which are secured upon the rear ends of the shafts 31 and 32 as clearly shown in Figure 2. The arms 28 are provided with diverging tines 28a with the result that when these arms 28 are lowered and brought into engagement with the ends of a paper bag, such ends will be folded inwardly substantially in the shape of a Y corresponding to the shape of the lower ends of the arms. This not only results in tucking the ends of the bag inwardly, but also creasing the same from the corners inwardly as clearly shown in Figure 3, a feature which is very important for the proper folding of the neck of the bag. The arms 28 are designed to be actuated at the proper moment by operating means controlled by the conveyor chain as will presently appear.

In referring to Figures 1, 3, and 4, it will be noted that a crank arm 36 extends from the shaft 32 and a pitman 37 is connected to the crank 36 at one end thereof while the other end of the pitman 37 is connected to a lever 38 which is pivoted intermediate its ends to a block 39 secured upon the machine bench 7. The lower end of the lever 38 is preferably notched as indicated at 40 and this notched end of the lever lies in the path of a pair of rollers 41 secured upon the top of the conveyor chain at each high bag propeller 22, as shown in Figures 1, 12, 15, 25 and 26. The rollers 41 are carried in a suitable casting attached to the chain 20 directly above the base of each upper or main propeller 22 and these rollers 41 are slightly spaced apart with the result that when the first roller engages the lever 38, the arms 28 will be given a quick downward action for tucking in the ends of the bag. A spring 42 which is suitably anchored to the framework of the machine is attached to the lever 38 above its pivot point and tends to actuate the lever 38 for elevating the arms 28. Consequently, as soon as the first roller has actuated the lever 38 and before the second roller reaches the same, the spring will elevate the arms 28 a predetermined amount until the second roller 41 strikes the lever 38 and there will be a second actuation of the arms 28 for again striking the ends of the bag, so that there is substantially two actuations of the arms 28 for folding in or tucking in the ends of the paper bag. Of course, it will be realized that the actuation of the arms 28 is very rapid, and there is only a slight interval between the two actuations.

Before proceeding, it might be desirable to state that when the bag leaves the feeding belt 1, it travels upon a bag platform 43 which is supported adjacent the side of the machine as is customary in the art. As soon as the neck of the bag is folded or tucked inwardly at its ends, it is collapsed or in other words flattened to a certain extent as is shown in Figure 4. The mechanism for collapsing or flattening the empty neck of the bag will now be set forth. Two pairs of upright posts or rods 44 are suitably supported over the bag platform 43 by a frame or the like as indicated in Figure 2. On the upper end of each rod 44 there is rigidly secured an arm 45. It will be noted that the rods 44 are arranged in pairs which are located in longitudinal alignment. To the arms 45 of one pair there is pivoted a neck collapsing plate 46 and a similar plate 46 is pivoted to the ends of the other pair of arms 45 whereby a form of parallel motion is produced. The most forward rod of each pair has an arm 47 rigidly secured thereto. One arm 47 carries a plate member 48 which extends into the path of the oncoming bag while the other arm 47 carries a plate member 48a which extends into the path of the oncoming bag. The forward ends of the plates 46 are preferably slightly outwardly curved as shown in Figure 2 to facilitate the entrance of the neck of the bag. When the oncoming bag strikes the plates 48 and 48a, the rods 44 will be rotated and the arms 45 thereon will move inwardly carrying therewith the neck collapsing plates 46 for flattening the empty neck of the bag. It will be noted with reference to Figure 2, that the plates 46 will also move forwardly in the direction of travel of the bags as they move inwardly so that the collapsing of the neck of the bag takes place while the bag is in motion. Generally, the neck of the bag is not clasped tightly together by the plates 46 but is always free to move relatively thereto even though the compressing plates 46 travel therewith. In referring to Figures 3 and 4, it will be noted that the rods 44 are journalled in suitable frame members 49 which may be supported in any suitable manner on the machine as before stated. It will further be noted that coil springs 50 are attached to the frame members 49 and surround the lower ends of the rods 44 and are attached to the arms 47 with the result that as soon as the bag passes beyond the plates 48 and 48a, the springs will return the same to their normal position in the path of the next oncoming bag, and the plates 46 will separate.

When the flattened neck of the bag passes from between the neck collapsing plates 46 it passes into a guideway as shown in Figure 5. This guideway is formed by a pair of upright metal plates 51 having lower right angle flanges 52 which are attached to the lower member of a rectangular frame generally noted by the reference numeral 53. It will be noted that the empty neck of the bag extends above the guides 51. A mechanism has been provided for engaging the same and folding it down, as shown in Figure 6. This mechanism consists of a folding blade 54 which is secured in the lower end of a lever 55 which extends from the upper transverse frame member 53a. In order to bend over the projecting portions of the neck of the bag, it is necessary that the lever 55 be mounted for swinging movement and also for a reciprocating movement. The particular features whereby this novel movement is imparted to the lever 55 are best illustrated in Figures 7 and 8 and in referring to these figures, it will be noted that the lever 55 has an upwardly sloping cam 57 upon one edge which terminates in a straight portion 58 and the convex cam 59 upon the opposite side. In referring to Figure 8, it will be noted that the cam portion 57 engages one wall of the slot in its bearing 56 and that the cam 59 engages the other wall thereof with the result that a downward pull upon the lever 55 will cause the same to swing or pivot in the slot. This is due to the fact that the cam portion 57 acts as a stop and does not allow the lever 55 to descend until it has swung to the left sufficiently far to pass the cam 59 through the slot. Thereafter the lever 55 will descend vertically. It will be appreciated that the swinging movement of the lever 55 will bend over the upper end of the neck of the bag and that the descending movement thereof will fold the same downwardly against one of the walls of the guide 51 as shown in Figure 6.

The foregoing movement of the lever 55 is effected by a lever 60 which is pivoted at one end to an intermediate point of the lever 55 and is fulcrumed intermediate its end upon a hanger 61 depending from the top frame member 53a. The free end of the lever 60 is connected to a pitman 62. The pitman 62 is adapted to be actuated by the conveyor chain in a manner disclosed in Figures 11 and 12. In referring to Figures 11 and 12, it will be noted that a pair of jointed links 63 and 64 connect the pitman 62 with one end of a triangular cam 65 pivoted at its opposite end to a support 66 upon the machine bench. The apex 67 of this cam 65 is adapted to be engaged by the aforementioned rollers 41 upon the conveyor chain with the result that when the cam 65 is elevated the link 60 will be actuated for oscillating the lever 55 and causing the same to descend for making the first fold in the neck of the bag as illustrated in Figure 6. Of course, after the first fold has been made, as illustrated in Figure 6, it is necessary to restore the parts to the position shown in Figure 8, and this will be brought about when the final fold is made as will now be explained.

In referring now to Figures 9 and 10, it will be noted that the partly folded neck of the bag passes into a U-shaped folding member 68 which is secured to a support 69 which in turn is pivoted intermediate its ends to a bearing block 70 secured upon an arm 71 attached to a block 72 secured to the lower part of a frame generally noted by the reference numeral 73. It will be appreciated that by pivoting the U-shaped folder 68 intermediate its ends, the same will kick the fold back beyond the center line, as shown in Figure 10, when the same has swung downwardly and thus positions the folded neck of the bag directly over the center line. The lower portions of the frame member 73 are provided with guide plates 73a which form a passage therebetween for the folded neck of the bag and one of these guide plates 73a is adapted to abut the neck of the bag when the same is folded over as shown in Figure 10. The U-shaped folding member 68 which makes the final fold in the neck of the bag is actuated by means of a link 74 connected to the upper end of the support 69 and connected to a lever 75 which is pivoted intermediate its ends upon a block 76 secured to the top of the frame 73. The free end of the lever 75 is connected to a pitman 76 which in turn is connected by a pair of jointed links 77 and 78 (Fig. 12) to a second cam member 79 which is pivoted upon a block 80 which is secured to the top of the machine bench 7. The apex 81 of the cam 79 is adapted to be positioned in the path of the aforementioned rollers 41 for actuation thereby, with the result that when the cam member 79 is moved upwardly the lever 75 will be swung into the position shown in Figure 10 for again folding the partially folded neck of the bag and making a double fold positioned substantially over the center line.

It will be appreciated that this double fold thoroughly seals the top of the bag against the escape of any material therein.

The two aforedescribed folding mechanisms are interconnected so that when one is operated the other is set for operation, as clearly shown in Figures 11 and 12. To this end, a cross head 82 connects the pivots of the jointed links 77—78 and 63 and 64, and this cross head has an upstanding detent 83 which is provided with a convex upper end which may be in the form of a roller for engaging concave notches 84 in the lower edge of a cross bar 85 which is pivoted upon an upright 86 at one end and which is slidably connected with a pin 87 upon another upright 88. These uprights extend upwardly from the bench 7. A spring 89 is anchored to the slidable end of the bar 85 and is connected to the upright 88. In referring to Figure 11, it will be noted that the cam 65 is in its lowered position and in the path of the oncoming rollers 41—41. When the cam 65 is actuated, it will bring the cross bar 82 from the position shown in Figure 11 to the position shown in Figure 12, whereby the cam member 79 is lowered into the path of the rollers and th's lowering of the cam member 79 will swing the U-shaped folder 68 into its vertical position, as shown in Figure 9 and set the parts for receiving the partially folded neck of the bag. When the rollers 41 advance and engage the cam 79, the same will be elevated for swinging the U-shaped folder downwardly for applying the final fold, and at the same time the cam member 65 will be lowered and the folder controlled thereby will be elevated into the position shown in Figure 8. It will be appreciated that both of the folding mechanisms are controlled by the conveyor chain, which actuates the same and re-sets them for a second operation.

It will be evident that due to the fact that one end of the cross bar 85 may be raised and lowered, the detent member 83 can readily move from one notch to the other during the operation of the different folding mechanisms.

The bag with the neck folded and superposed over the center line as shown in Figure 10, passes from the U-shaped folder and under a tape box 90. Above the tape box upon a suitable stanchion there is supported a reel 91 of gummed tape 92 which passes into the tape box through a suitable opening provided therefor. In referring now to Figure 17, it will be noted that upon entering the tape box, the tape is guided by the guide roll 93 to feed rolls 95 between which the tape passes to a shearing platform 96. The roll 94 rolls down the fold on the bag as the same passes thereunder. The tape passes over the shearing platform and over a moistening roller 97 against which it is maintained by a comb-shaped device 97a freely supported on an arm 97b attached to shaft 119 to be later described. From the roll 97, the tape is guided by the guide rolls 98 into the path of the oncoming bag, the lower roll of which presses or maintains the tape on the bag.

The moistening roll 97 is contained in a fluid tight container or well in which the fluid is maintained at a substantially constant level so that the roll will not carry too much fluid to the tape. Above the tape box there is a fluid container 99 which is in the form of an ordinary Mason jar, as shown more clearly in Figures 13 and 14. Within the Mason jar, there is a spring support 100 which is firmly soldered or welded to the cover thereof. A suitable pipe 101 extends through the cover and into the fluid container or well in which the roll 97 is located. The upper end of the tube 101 is closed by a valve 102 which is pressed downwardly by a coil spring 103 which engages the top of the support 100. A rod 104 extends through the top of the support 100 and through the valve 102 and through the pipe 101 with the result that when the container 99 is placed in position, the rod 104 will strike the bottom of the fluid well for opening the valve 102 and allowing the fluid from the Mason jar to flow into the fluid well. This arrangement will maintain a constant level of fluid or water in the well for supplying the roller 97 according to well-known principles. It will be appreciated that as the bag advances, the lower guide roller 98 will apply the tape over the top of the bag and this tape is usually of such a length as to project beyond the ends of the bag, so that the same may be folded or secured upon the ends of the bag as will later more fully appear. When a sufficient length of tape has been fed forwardly according to the travel of the bag, it is sheared off by a suitable shears which is controlled from the traveling chain in a manner that will now be explained. It might also be pointed out that the aforedescribed feed rolls are set in motion by the movement of the chain so that a proper length of tape is fed forwardly.

The mechanism for driving the rolls in the tape box will now be set forth. In referring to Figure 2, it will be noted that a motor 105 is mounted upon the bench 7 and this motor is geared to a shaft 106 which in turn is geared by suitable sprocket gearing 107 to a shaft 108. The shaft 108 is geared by suitable sprocket gearing 109 to a shaft 110 which supports the moistening roll in the tape box. The shaft 110 carries a gear 111 which meshes with an idler gear 112 which in turn meshes with a gear 113 upon a clutch shaft 114 which carries the lower feed roll 95. The shafts of these feed rolls 95 are geared together upon their rear ends by suitable gears 95a as shown in Figure 9. The gear 113 on the clutch shaft 114 meshes with a gear 115 secured upon a shaft 116 that carries the aforementioned guide roll 94 which is adapted for rolling and smoothing down the folds upon the top of the bag as the bag passes thereunder. The upper guide roll 93 which guides the tape is an idler roll and requires no driving mechanism. The aforementioned shaft 110 also carries a second gear 117 which meshes with a gear 118 secured upon the shaft 119 of the upper guide roll 98 and the shaft 119 of this upper guide roll is geared by suitable sprocket gearing 120 to the shaft 121 that carries the lower guide roll 98 that rolls and applies the tape over the top of the bag as it proceeds on to the taping mechanism. During the normal operation of the machine, the gear 113 upon the clutch shaft 114 is normally running idle and no tape is fed forwardly. The bag is adapted to operate mechanism to throw in a clutch on the shaft 114 and set the tape feeding rolls into operation for advancing a piece of tape and as soon as the proper length of tape has been fed forwardly, the conveyor chain will throw out the clutch. The mechanism for throwing in and throwing out the clutch on shaft 114 will now be described.

In referring now to Figures 18, 19, 20, and 22, it will be noted that the gear 113 is loosely mounted upon the shaft 114 and carries a clutch hub 122 that is adapted to be engaged by a sliding clutch member 123 which is suitably keyed upon the shaft 114. The clutch member 123 is connected with the usual form of shipper lever 125 which is rigidly secured to a rod 126 journalled in suitable bearings 127 on the framework of the machine. The rod 126 has a pair of arms 128 which are rigidly secured thereto as shown in Figures 1, 2, and 13. With reference to Figure 13, it will be observed that these arms extend diagonally from the rear towards the front and are connected by a longitudinally extending bar 129 upon which an abutment 130 is longitudinally adjustable by means of screws or the like. The forward end of the abutment 130 is slightly curved to the rear so as to cause the oncoming bag to readily engage the same and press the same rearwardly. As the abutment 130 is pressed rearwardly, the arms 128 are also swung rearwardly for rotating the rod 126 for swinging the shipper lever 125 and connecting the clutch member 123 with the gear 113.

Figure 22:
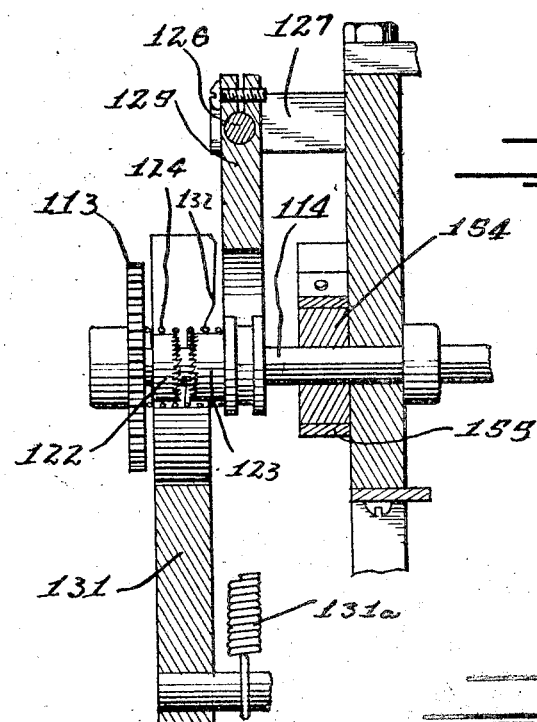
Figure 22 is an enlarged sectional view taken upon the line XXII—XXII of Figure 20.

Mechanism has been provided for immediately throwing the clutch member 123 out of engagement with the gear 113 when a proper length of tape has been fed forward. This mechanism is best illustrated in Figures 18, 19, and 22, and in referring to these figures, it will be noted that a forked member 131 is positioned between the gear 113 and the shipper lever 125. The fork of this member 131 straddles the jaw clutch and is provided with cam surfaces 132 upon its forks which are adapted for engaging over the fork of the lever 125 and shift the same to disengage the clutch member 123 when the member 131 is pulled downwardly. Member 131 is adapted to be pulled downwardly by a trip 133 (Figure 1) which is pivoted upon a bearing block upon the bench as indicated at 134. The trip 133 is pivoted to the lower end of the member 131 as indicated at 135. It will be noted that the trip 133 is in the form of a bell crank lever with one arm connected to the member 131 and the other arm being provided with a slot engaging a pin 136 upon the edge of the bench 7. The trip is provided with a depending lug 137 normally positioned in the path of the rollers 41 with the result that when the trip 133 is actuated by the rollers 41, the cam member 131 will be pulled downwardly for shifting the shipper lever 125 to an inoperative position for disengaging the clutch member 123. When the clutch has been disengaged, a spring 131a (Figs. 18 and 12) will elevate the cam bar 131 so that when the shipper lever 125 is again actuated the arcs of its forks can engage under the cams 132 of the cam bar 131. When the shipper lever 125 is moved to its inoperative position, the rods 126 will be rotated for returning the abutment 130 into the path of the next oncoming bag. It might be here mentioned that each succeeding bag will also actuate the abutment 130 for actuating the shipper 125 for again engaging the clutch member 123 with gear 113 so each bag sets the tape-feeding rolls in operation for supplying the tape thereon. Consequently, the tape will always be moist as it will not have to dangle in the air for any appreciable time. It will also always be supplied in proper timed relation with the approaching bag. This is an important feature in the operation of such a machine. It will hence be observed that the feeding of the tape is controlled by the traveling movement of the bag and that the tape is only fed forward when a bag is traveling through the machine, whereby it is impossible for the tape to be exposed to the air for any length of time so the same may dry.

After a suitable length of tape has been fed by the feed rollers and applied to the top of the bag it is sheared off by means of a shears which is controlled by the traveling movement of the bag. The shears which is designated by the reference numeral 138 is best shown in Figure 18. It is pivoted intermediate its ends as at 139 (Fig. 18) upon a suitable bearing block attached to the inner wall of the housing and extends through a slot in such wall. The forward end of the shears is connected to a coil spring 140 which is anchored at its lower end to a screw 141 extending through the wall of the tape box. The opposite end of the shears 138 extends through the aforementioned opening in the tape box and is connected to a link 142 which in turn is connected to a bell crank trip 143 (Fig. 1) which lies in the path of the rollers 41 on the conveyor chain for actuation thereby.

Mechanism has been provided for normally holding the shears in elevated position against the tension of the spring 140, and this means is adapted to be released by the traveling movement of the bag conveyor for allowing the spring 140 to actuate the shears for cutting off the tape. To this end, a holding dog 151 (Figure 21) has been provided for engaging a notch or recess in the end of the shears remote from the cutting end. This dog 151 has to be released before the shears can be operated by the spring 140 and this mechanism will now be more fully described.

Figure 21:
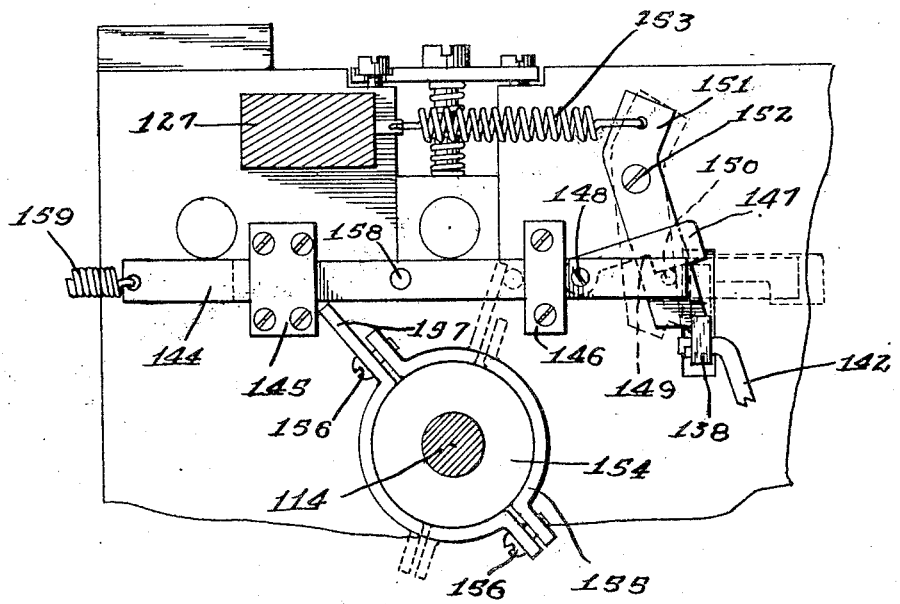
Figure 21 is a sectional view taken upon the line XXI—XXI of Figure 20 illustrating parts in elevation.

In referring more specifically to Figure 21, it will be observed that a slide bar 144 is mounted in keepers 145 and 146 upon the outside of the tape box. This slide bar 144 carries a latch dog 147 which is pivoted thereto as indicated at 148. The latch dog 147 normally rides upon a pin 150 which is carried by the holding dog 151. It will be noted that the holding dog 151 is pivoted intermediate its ends as indicated at 152 to the wall of the tape box and that the upper end thereof is connected to a spring 153 which is anchored to a block upon the side of the tape box. The latch dog 147 is provided with a notch or recess 149 which is adapted for engaging the pin 150 as will later more fully appear. Upon the shaft 114 there is secured a disc 154 around which a brake shoe 155 extends. This brake shoe consists of a pair of bands or shoes connected by suitable screws 156 whereby the frictional resistance between the brake and the disc may be adjusted. One part of the brake shoe 155 is provided with an outwardly extending arm 157 which is adapted for engaging a stud 158 upon the slide bar 144. Now, when the shaft 114 is rotated, for feeding tape, the arm 157 will be caused to rotate in a clockwise direction and slide the bar 144 to the right until the stud 158 engages the keeper 146 as indicated in dotted lines. This movement of the slide bar 144 will cause the latch dog 147 to ride off of the pin 150

150 upon the holding dog 151 and drop behind such pin, as indicated in dotted lines in Figure 21. As soon as the clutch 123 is disconnected to stop the rotation of the shaft 114, a spring 159 which is connected to the end of the slide bar 144 acts to draw the slide bar 144 to the left and engage the dog 147 with the pin 150 upon the dog 151 for swinging such dog to the left as shown in dotted lines and release the shears 138 so that the spring 140 may actuate the same. When the shears descend for a cutting operaton, the outer end moves upwardly and elevates the dog 147 above the pin 150, and as the slide bar 144 is being drawn to the left, the head of said dog 147 will be moved over the top of the pin 150 as shown in Figure 21. Directly after the shears has been actuated by the spring 140, the trip 143 will be actuated for elevating the cutting portion of the shears and lowering the outer end thereof and allowing the spring 153 to swing the holding dog 151 over the top of the shears for maintaining the same in its inoperative position. The notch in the end of the shears that receives the dog 151 limits the swinging movement of such holding dog in a counterclockwise direction.

As the bag emerges from under the tape box, the tape will be rolled over the top thereof by the lower guide roll 98 and the bag will advance with the sheared piece of tape lying in its position thereon until it comes directly under the tape applying mechanism at which time the high bag propeller 22 which propels the bag up to this point will swing rearwardly with respect to the travel of the chain against a buffer 160 (Figure 13) due to the fact that the roller 24 thereof will ride off the track 25 which, as before related, is made sufficiently short at the rear end of the machine for such a purpose. The conveyor chain, however, will continue to travel and this swung-back propeller will pass behind the bag. The coil spring 22a (Figure 1) that is secured to each propeller 22 causes the same to flop against the buffer when the end of the upper track 25 is reached. Consequently, the bag will remain stationary for a predetermined period under the tape applying mechanism to allow the tape to be applied. As soon as the tape is properly applied and the bag is free to be advanced, the following short or low propeller 23 will engage the bag and shift the same rearwardly upon its platform and under a brush 162 or the like for straightening any wrinkles out of the tape and firmly holding the same upon the bag until the glue has become firmly set.

Rising from the top of the bench 7, there are a pair of uprights or standards 163. A suitable frame 164 is slidably mounted upon the rods by means of bearings 165 as shown in Figure 15. This frame carries a compression plate 166 which is adapted for engaging the top of the bag for firmly pressing the tape thereon. The compression plate is adapted to be held in elevated position above the bag by means of a coil spring 167 which surrounds one of the rods 163 between the bearing 165 and the supporting base of the rods 163. The plate 166 is adapted to be reciprocated downwardly at the proper time by means of a cam 168 which is adapted for engaging a roller 169 secured to the bearing block 165. The tape is adapted to be applied to the ends of the bag by means of a pair of yieldingly mounted arms 170 carrying rollers 170a at their lower ends, which roll downwardly against the ends of the bag and press the tape thereagainst. The arms 170 are mounted on a reciprocating carriage 171 which is slidably mounted upon the rods 163 and the arms are forced against the ends of the bag by means of a spring 173 which connects the two arms. The carriage 171 is adapted to be moved downwardly by means of a rack bar 172 secured to said carriage and operated by a mutilated gear 174. A transverse bar 175 extends across the top of the standards 163 and a pair of coil springs 176 connect this transverse bar with the carriage for elevating the carriage against a yielding abutment 177 which is slidably mounted upon the guide rods 163. The yielding abutment 177 is slidably mounted upon a rod 178 which is anchored at its upper end in the transverse member 175 and a coil spring 179 is confined between the transverse member 175 and the abutment 177 and yieldingly cushions such abutment when the carriage 171 is pulled upwardly by the springs 176.

The aforementioned cam 168 and gear 174 are secured upon the shaft 180 which is journalled in suitable supports upon the bench 7, and carries a gear 181 upon its outer end which meshes with a gear 182 upon the shaft 183 journalled in said support. The shaft 183 has a beveled gear 184 which meshes with a beveled gear 185 which is connected to the head sprocket 19 which is adjustably secured to a disc 187 secured to the shaft 188 that carries the beveled gear 185 by means of suitable screws 189 extending through slots 190 in said disc. By this adjustable means, it is possible to set the head sprocket 19 so that the propellers and rollers upon the conveyor chain will operate in proper timed relation with those parts which they are intended to operate. The shaft 183 is adapted to be driven by suitable sprocket gearing 191 (Fig. 2) connected with the aforementioned shaft 108 driven from the motor 105.

The conveyor 1 that feeds the bags to the bag platform or runway 43 is preferably driven by a separate electric motor 192 which is suitably geared to the head pulley that drives the belt 1. The bench 7 that supports the operating mechanism is adapted to be raised or lowered in order to accommodate different size bags and to this end, the supporting standards are in the form of screws which are adapted to be raised or lowered by means of suitable nuts 193 as shown in Figure 1.

While the operation of the machine is apparent from the foregoing description, it will be briefly described in a more connected way. When the two motors on the machine are set in motion, the feed belt 1 and the chain conveyor will rotate. Assuming that a filled paper bag has been placed upon the feeding belt 1, it will be carried along until it is arrested by the stop 4 and until said stop is swung out of the path of the bag by means of the bar 5, which has a connection extending in the path of the rollers 26 on the short propellers. The released bag will be carried by the belt 1 upon the bag platform 43 where it will be engaged by one of the high propellers 22 and moved along such platform. As it moves along, the aforementioned rollers 41 will actuate the lever 38 for bringing down the end tuckers 28 for tucking in the ends of the bag. Due to the fact that there are two rollers 41, the lever 38 will be given a double actuation for twice applying the end tuckers 28.

Before the end tucking operation has been completed, the neck of the bag will pass between the plates 46 which are swung inwardly and rearwardly in the direction of movement of the bag by means of the plates 48 and 48a, which are adapted to be engaged by the moving bag. These plates 46 collapse the neck of the bag and partially flatten the same. As soon as the neck of the bag has been collapsed or pressed together, it passes between the guide plates 51 at which time the first folder 54 is actuated for applying the first fold as shown in Figure 6. The partly folded neck of the bag then passes into the U-shaped folder 68 (Figure 9) which folds the neck of the bag as shown in Figure 10, and positions the fold over the center line of the bag. As previously pointed out, these folding mechanisms are interconnected so that when one is operated the other is set for operation. The folded neck of the bag then passes under a suitable guide leading to the bottom of the tape box and as the bag continues its travel it will actuate the abutment 130 for throwing in the clutch and setting the tape operating gears in operation so that a piece of tape may be advanced in the path of the bag. As soon as a piece of tape of proper length has been advanced, the rollers 41 on the chain will engage the trip 133 and disengage the clutch 123. While the tape is being advanced, that is, when the shaft 114 is being revolved, the slide plate 144 shown in Figure 21 will be shifted to the right to set the same for withdrawing the dog 151 from engagement with the shears and as soon as the shaft 114 stops revolving the spring 159 will pull on the bar 144 and withdraw the dog 151, allowing spring 140 to actuate the shears. As the bag travels on with the tape in position over the top thereof, and projecting beyond the ends thereof, the tape will be rolled against the top of the bag by the lower feed roll 98 and when the aforementioned rollers 41 engage the trip lever 143 the shears which has previously been actuated will be elevated to allow the spring 153 to swing the dog 151 to engage in the notch thereof. The bag with the tape applied will then pass under the taping mechanism at which time the high propeller that has been propelling the bag will run off of its track 25 and the spring thereon will cause the same to flop against the buffer 160 so that it can pass behind the bag which will remain stationary for a predetermined period until the tape has been applied thereon by means of the rollers 178 and the pressure plate 166 and when these operations are completed, the succeeding lower bag propeller 23 will engage the bag and continue its movement upon its platform 43 beyond the ends of the machine and under the brush 162.

We are aware that many changes may be made and numerous details of construction may be varied through a wide range without departing from the principles of this invention, and we, therefore, do not purpose limiting the patent granted hereon otherwise than is necessitated by the prior art.

We claim as our invention:

1. In a bag closing machine, a bag platform, a bag conveyor for propelling bags along said platform, mechanism for crimping the ends of the bag, mechanism for folding the crimped neck of the bag and devices on said conveyor for successively actuating said mechanisms.
2. In a bag closing machine, a pair of swingable arms having fork-shaped ends, a bag platform, a conveyor chain for moving bags along said platform and coacting means between said arms and chain for imparting a double action to said arms during the movement of said chain for crimping inwardly the ends of the empty neck of the bag.

3. In a bag-closing machine, the combination with means for crimping the ends of the bag, of means actuated by the bag for collapsing the neck of the bag, and means for folding the collapsed neck of the bag.

4. In a bag-closing machine, mechanism for crimping the ends of the bag on diagonal lines, compressor plates actuated by the movement of the bag for collapsing the empty neck of the bag, a guide for receiving the collapsed neck of the bag, a folding member for folding the neck of the bag over said guide, a U-shaped guide for receiving the partly folded neck of the bag, means for actuating said U-shaped guide for completing the folding of the neck of the bag, a bag platform, a conveyor chain for propelling the bags along said platform and means on said chain for actuating said end crimpers and said folding members.

5. In a bag-folding machine, a bag platform, a propelling mechanism for sliding the bag along said platform, mechanism for folding inwardly the ends of the bag, mechanism actuated by the moving bag for collapsing the empty neck of the bag, a vertical guide for receiving the collapsed neck of the bag, a folding member for partially folding the neck of the bag over said vertical guide, a vertical U-shaped folding member pivoted intermediate its upper and lower margins for receiving the partially folded neck of the bag and means for actuating said U-shaped folding mechanism to horizontal position and shifting the same for bringing the fold over the center line of the bag.

6. In bag-closing machine, a bag runway, a conveyor for propelling the bags along said runway, end crimping mechanism actuated by said conveyor for folding inwardly the neck of the bag upon divergent lines, a pair of compressor plates actuated by the moving bag for collapsing the empty neck of the bag, a vertical guide for receiving the collapsed neck of the bag, a folding member for moving laterally and downwardly over said vertical guide for partially folding the neck portion of the bag, a vertical U-shaped folding member adapted for receiving the partially folded neck of the bag, and means actuated by said conveyor for swinging downwardly and inwardly said U-shaped folding mechanism for completing the folding of the neck of the bag and positioning the same over the center line of the bag.

7. In a bag-closing machine, a bag runway, a conveyor for propelling the bag along said runway, mechanism for folding inwardly the ends of the neck of the bag, means actuated by the moving bag for collapsing the neck of the bag, a pair of spaced folding members for folding over the neck of the bag upon the center line thereof, mechanism for connecting said folding members and means actuated by said conveyor for operating one folding member and setting the other into position for operation.

8. In a bag-closing machine, mechanism for folding inwardly the empty neck of the bag, two pairs of vertical supports, arms mounted upon said supports, a plate secured to each pair of arms and depending members upon the forward support adapted to be actuated by a moving bag for swinging said plates inwardly and rearwardly in parallel relation.

9. In a bag-closing machine, a bag runway, a conveyor for propelling the bags along said runway, mechanism for crimping the empty neck of the bag, means for folding the empty neck of the bag, tape feeding rolls, mechanism for operating said tape feeding rolls, means set in motion by the moving bag for controlling said operating mechanism for starting and stopping the same, a shears for severing a piece of tape, mechanism controlled by the conveyor for controlling the operation of said shears, means for applying the sheared piece of tape over the top of the bag during its traveling movement, and means for rendering inoperative a portion of said bag conveyor at a predetermined point for the purpose set forth.

10. In a bag-closing machine, mechanism for folding the empty neck portion of the bag, means for superposing a piece of adhesive tape over the folded neck of the bag, mechanism for cutting the tape, means for applying the tape to the bag in combination with a conveyor chain having bag propelling members adapted to swing rearwardly for passing behind a bag when said tape is applied.

11. In a bag-closing machine, a bag runway, a bag conveying chain above said runway, said chain having bag propelling members, a pair of spaced tracks below said runway, said bag propelling members having rollers traveling upon said tracks, one of said tracks terminating short of the end of the machine, whereby the propeller supported on said short track will swing rearwardly at a predetermined point.

12. In a bag-closing machine, mechanism for folding the empty neck portion of the bag, means for superposing a piece of tape over the folded neck portion of the bag, a tape applying station, mechanism at said station for applying the tape, a bag runway, a bag conveyor having laterally extending members for propelling the bag along said runway, and means for rendering inoperative said members at said tape-applying station.

13. In a bag closing machine, a folding member having a guide way for receiving the neck portion of a bag and means for operating said member and positioning the folded portion of the bag over the center line thereof.

14. In a bag closing machine, a bag runway, a conveyor chain having flights for propelling the bag along said runway, and means for rendering a flight inoperative at a predetermined point for arresting the bag for the next succeeding flight.

15. In a bag closing machine, a pivotally mounted folding member having a guideway normally positioned in a vertical plane for receiving a partially folded neck portion of a bag and means for swinging said member downwardly into a substantially horizontal plane for superposing the folded neck portion upon the top of the bag.

16. In a bag closing machine, a pair of end folding members, each comprising a stem for making a vertical indenture in the end of a bag, and diverging tines extending from one end of each stem for making diverging creases in the ends of the bag and means for simultaneously operating said members.

17. In a bag closing machine, a bag runway, a continuously operating conveyor for propelling bags along said runway, a bag feeding conveyor for advancing bags to said runway, a longitudinally extending bar adjacent said feed conveyor, said bar having a stop member extending over a portion of said feed conveyor, means for pivoting said bar intermediate its ends to said machine and means operated by said conveyor for swinging said bar and stop for releasing said bags.

18. In a bag closing machine, a continuously operating conveyor adapted for propelling filled bags in upright position, means actuated by said conveyor for folding the neck portion of the bag, tape feeding mechanism including a clutch for starting and stopping the same, means actuated by the moving bag for operating said clutch, means for shearing a piece of tape and means applying the same over the folded top of the bag.

19. In a bag closing machine, a platform, a conveyor for sliding filled bags along said platform, mechanism for folding inwardly the upper ends of the bag set in motion by said conveyor, mechanism set in motion by the moving bag for collapsing the side portions of the empty neck of the bag, means for folding the collapsed neck portion of the bag and positioning the same over the center line of the bag, and means for applying a piece of adhesive tape over the folded neck portion of the bag.

20. In a bag closing machine, a longitudinally extending platform, a conveyor for sliding filled bags along said platform, mechanism actuated by said conveyor for folding inwardly the ends of the neck of the bag, mechanism actuated by the moving bag for collapsing the sides of the neck of the bag, folding members for folding over the neck portion of the bag and positioning the same over the center line of the bag, and means for applying a piece of adhesive tape over the folded neck portion of the bag.

CHARLES F. ALLISON.
PAUL NAEHER.